(12) United States Patent
Kikuchi et al.

(10) Patent No.: US 12,556,814 B2
(45) Date of Patent: Feb. 17, 2026

(54) IMAGE PICKUP APPARATUS AND ITS CONTROL METHOD

(71) Applicant: CANON KABUSHIKI KAISHA, Tokyo (JP)

(72) Inventors: Hirotaro Kikuchi, Tokyo (JP); Koichi Fukuda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 126 days.

(21) Appl. No.: 18/637,544

(22) Filed: Apr. 17, 2024

(65) Prior Publication Data

US 2024/0406553 A1 Dec. 5, 2024

(30) Foreign Application Priority Data

Jun. 2, 2023 (JP) .................................. 2023-091779

(51) Int. Cl.
  H04N 23/67 (2023.01)
  G02B 7/34 (2021.01)

(52) U.S. Cl.
  CPC .............. *H04N 23/672* (2023.01); *G02B 7/34* (2013.01)

(58) Field of Classification Search
  CPC ................................ H04N 23/672; G02B 7/34
  See application file for complete search history.

(56) References Cited

U.S. PATENT DOCUMENTS

| | | | | |
|---|---|---|---|---|
| 2012/0133821 A1* | 5/2012 | Takaiwa | ............... | H04N 25/704 348/E5.045 |
| 2021/0333690 A1* | 10/2021 | Watanabe | ............. | H04N 25/134 |
| 2023/0319435 A1* | 10/2023 | Lee | ...................... | H04N 25/704 348/308 |

FOREIGN PATENT DOCUMENTS

| | | |
|---|---|---|
| JP | 2010263568 A | 11/2010 |
| JP | 2016111452 B2 | 6/2016 |
| JP | 2020057893 A | 4/2020 |
| JP | 2020123824 A | 8/2020 |
| JP | 7027133 B2 | 3/2022 |

OTHER PUBLICATIONS

The Jun. 10, 2025 Japanese Office Action, which is enclosed without an English Translation, that issued in Japanese Patent Application No. 2023-091779.

* cited by examiner

*Primary Examiner* — Gevell V Selby
(74) *Attorney, Agent, or Firm* — Cowan, Liebowitz & Latman, P.C.

(57) ABSTRACT

An image pickup apparatus includes an image sensor, and a processor that configured to detect a phase difference between a pair of detection signals generated by signals read out of at least a part of pixels, perform a first detection for detecting the phase difference in the first direction and a second detection for detecting the phase difference in the second direction, perform first processing for acquiring the information by the first detection or the second detection in a case where a shutter speed including a period during which the pair of detection signals are generated is longer than a predetermined time, perform second processing for acquiring the information by the first detection irrespective of the second detection in a case where the shutter speed is shorter than the predetermined time, and set the predetermined time to be longer as an F-number of the optical system is larger.

13 Claims, 8 Drawing Sheets

IMAGE PICKUP APPARATUS AND ITS CONTROL METHOD

BACKGROUND

Technical Field

One of the aspects of the embodiments relates to an image pickup apparatus configured to perform focus detection using an imaging-surface phase-difference detecting method.

Description of Related Art

In the imaging-surface phase-difference detection method, an image sensor configured to capture an object is used as a focus detecting sensor that performs pupil division to perform focus detection according to the phase-difference detecting method. Each of Japanese Patent Laid-Open No. 2010-263568 and Japanese Patent No. 7027133 discloses an image pickup apparatus that performs focus detection in each of mutually different first and second pupil division directions. In order to secure focus detecting performance and live-view display time, Japanese Patent No. 7027133 discloses that a focus detecting signal in the second pupil division direction is thinned out or not generated under the conditions of a high continuous imaging speed, a bright F-number, bright object luminance, or the like during high-speed readout from the image sensor.

Since the second pupil division direction is different from the first pupil division direction corresponding to the signal readout direction from the image sensor, a readout time difference in a correlation direction for detecting a phase difference becomes large. As the readout time difference in the correlation direction becomes large, an error due to the time difference is superimposed on the focus detecting signal, and the focus detecting accuracy degrades. The conditions where the degree of decrease in focus detecting accuracy becomes large include a high moving speed of an object image on the image sensor, a slow readout speed relative to the shutter speed, a dark F-number, and the like. The image pickup apparatus disclosed in Japanese Patent No. 7027133 has difficulty in suppressing the decrease in focus detecting accuracy caused by the readout time difference in the correlation direction according to an imaging condition.

SUMMARY

An image pickup apparatus according to one aspect of the disclosure includes an image sensor that includes a plurality of pixels configured to photoelectrically convert each of light beams that have passed through mutually different pupil areas in an optical system, signal readout from the pixels in a first direction being sequentially performed in a second direction, and a processor configured to acquire information regarding focus or a distance by detecting a phase difference between a pair of detection signals generated by signals read out of at least a part of the plurality of pixels, perform a first detection for detecting the phase difference in the first direction and a second detection for detecting the phase difference in the second direction, perform first processing for acquiring the information by the first detection or the second detection in a case where a shutter speed including a period during which the pair of detection signals are generated is longer than a predetermined time, perform second processing for acquiring the information by the first detection irrespective of the second detection in a case where the shutter speed is shorter than the predetermined time, and set the predetermined time to be longer as an F-number of the optical system is larger. A control method of the above image pickup apparatus also constitutes another aspect of the disclosure.

An image pickup apparatus according to another aspect of the disclosure includes an image sensor that includes a plurality of pixels configured to photoelectrically convert each of light beams that have passed through mutually different pupil areas in an optical system, and a processor configured to acquire information regarding focus or a distance by detecting a phase difference between a pair of detection signals generated by signals read out of at least a part of the plurality of pixels, perform a first detection for detecting the phase difference in a first direction and a second detection for detecting the phase difference in a second direction different from the first direction, acquire the information by the first detection in a case where a readout time in the first direction is shorter than a readout time in the second direction, in a detection area for generating the pair of detection signals on the image sensor, and acquire the information by the second detection in a case where the readout time in the second direction is shorter than the readout time in the first direction. A control method of the above image pickup apparatus also constitutes another aspect of the disclosure.

Further features of various embodiments of the disclosure will become apparent from the following description of embodiments with reference to the attached drawings.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure.

First Embodiment

Figure 1:
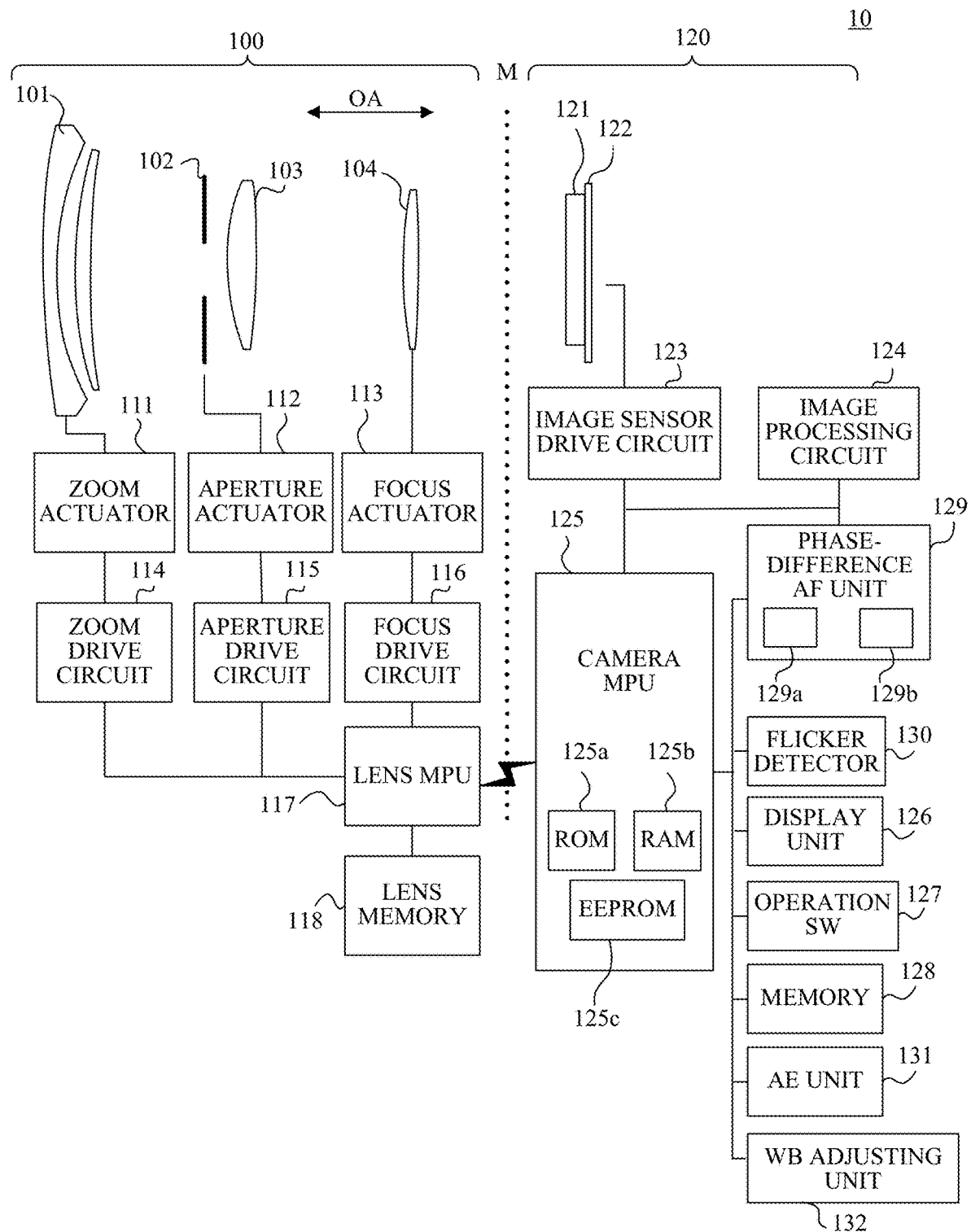
FIG. 1 illustrates the configuration of an imaging system according to a first embodiment.

FIG. 1 illustrates the configuration of an imaging system 10 including an image pickup apparatus (referred to as a camera body hereinafter) 120 according to a first embodiment. A lens apparatus (interchangeable lens) 100 is attached to and detachable from the camera body 120 as a digital camera via a mount M indicated by a dotted line in FIG. 1. The image pickup apparatus may be integrated with an imaging optical system. The image pickup apparatus is not limited to the digital camera but may be another image pickup apparatus such as a video camera.

The lens apparatus 100 includes an imaging optical system and a drive/control system. The imaging optical system includes a first lens unit 101, an aperture stop (diaphragm) 102, a second lens unit 103, and a focus lens unit (simply referred to as focus lens hereinafter) 104. The imaging optical system receives light from an object and forms an object image.

The first lens unit 101 is disposed closest to the object (foremost) in the imaging optical system, and is movable in an optical axis direction in which an optical axis OA extends. The aperture stop 102 adjusts a light amount by changing its aperture diameter, and functions as a shutter that controls the exposure time in capturing a still image. The aperture stop 102 and the second lens unit 103 are movable together in the optical axis direction, and achieve zooming in association with the movement of the first lens unit 101. The focus lens 104 moves in the optical axis direction during focusing. Autofocus (AF) control is provided by controlling the position of the focus lens 104 in the optical axis direction according to a focus detection result, which will be described below.

The lens drive/control system includes a zoom actuator 111, an aperture actuator 112, a focus actuator 113, a zoom drive circuit 114, an aperture drive circuit 115, a focus drive circuit 116, a lens MPU 117, and a lens memory 118. During zooming, the zoom drive circuit 114 drives the first lens unit 101 and the second lens unit 103 in the optical axis direction by driving the zoom actuator 111. The aperture drive circuit 115 drives the aperture actuator 112 to operate the aperture stop 102 for an aperture operation or a shutter operation.

During focusing, the focus drive circuit 116 moves the focus lens 104 in the optical axis direction by driving the focus actuator 113. The focus drive circuit 116 has a function as a position detector configured to detect the current position of the focus lens 104 (referred to as a focus position hereinafter).

The lens MPU 117 performs calculations and processing relating to the lens apparatus 100, and controls the zoom drive circuit 114, the aperture drive circuit 115, and the focus drive circuit 116 according to a request from the camera MPU 125. The lens MPU 117 is connected communicably to the camera MPU 125 through a communication terminal in the mount M and communicates commands and data with the camera MPU 125. For example, the lens MPU 117 transmits lens information to the camera MPU 125 according to a request from the camera MPU 125. This lens information includes information about the focus position, the position and diameter of the exit pupil of the imaging optical system in the optical axis direction, and the position and diameter in the optical axis direction of the lens frame that limits a light beam from the exit pupil.

The exit pupil in the imaging optical system is a virtual image formed by a lens located on the image side of the aperture stop 102. Light from a certain point on the object forms an image on the imaging surface of an image sensor 122, which will be described below, as a conical light beam with the exit pupil at the bottom. That is, the exit pupil determines the light beam that the image sensor 122 receives. The position of the exit pupil is an intersection of the principal ray of the off-axis exit light and the optical axis OA. Particularly at a peripheral image height, a light beam passing through the exit pupil is limited by upper and lower lines according to the imaging optical system. In this embodiment, the limit on the light beam passing through the exit pupil will be referred to as a lens frame shield. Normally, the degree of the lens frame shield differs for each lens unit (imaging optical system).

The lens MPU 117 controls the zoom drive circuit 114, the aperture drive circuit 115, and the focus drive circuit 116 according to a request from the camera MPU 125. The lens memory 118 stores optical information necessary for AF. The camera MPU 125 controls the operation of lens apparatus 100 by executing programs stored in built-in nonvolatile memory and lens memory 118.

The camera body 120 includes an optical low-pass filter 121, an image sensor 122, an image processing circuit 124, and a drive/control system. The optical low-pass filter 121 is provided to reduce false colors and moiré. The image sensor 122 includes a CMOS sensor and its peripheral circuits, photoelectrically converts an object image (optical image) formed by an imaging optical system, and outputs an imaging signal and a pair of focus detecting signals (two-image signals). In the image sensor 122, a plurality of imaging pixels of m pixels in the horizontal direction and n pixels in the vertical direction (m and n are integers of 2 or more) are arranged. Each imaging pixel includes a pair of focus detecting pixels, as will be described below, and has a pupil division function that allows focus detection using a phase difference detection method.

The drive/control system includes an image sensor drive circuit 123, an image processing circuit 124, the camera MPU 125, a display unit 126, an operation switch (SW) 127, a memory 128, a phase-difference AF unit 129, a flicker detector 130, an AE unit 131, and a white balance (WB) adjustment unit 132. The image sensor drive circuit 123 controls charge accumulation and signal readout in the image sensor 122, and also A/D converts the imaging signal and the pair of focus detecting signals output from the image sensor 122, and outputs the A/D converter to the image processing circuit 124 and camera MPU 125. The image processing circuit 124 performs image processing such as y conversion, color interpolation processing, and compression encoding processing on the digital imaging signal from the image sensor drive circuit 123 to generate image data.

The camera MPU (control unit) 125 is a computer that executes calculations and processing relating to the camera body 120, and controls the image sensor drive circuit 123, the image processing circuit 124, the display unit 126, the phase-difference AF unit 129, the flicker detector 130, and an auto-exposure (AE) unit 131 and the WB adjustment unit 132. The camera MPU 125 is communicably connected to the lens MPU 117 through the communication terminal of the mount M, and communicates commands and data with the lens MPU 117. For example, the camera MPU 125 requests the lens MPU 117 for lens information and optical information, or requests the lens MPU 117 to drive the lenses 101 and 104 and the aperture stop 102. The camera MPU 125 receives lens information and optical information transmitted from lens MPU 117.

The camera MPU 125 includes a ROM 125*a* that stores various programs, a RAM 125*b* that stores variables, and an EEPROM 125*c* that stores various parameters. The camera MPU 125 executes various processing including AF processing, which will be described below, according to programs stored in ROM 125*a*. The camera MPU 125 generates two-image data from the pair of digital focus detecting signals from the image sensor drive circuit 123 and outputs it to the phase-difference AF unit 129.

The display unit 126 includes an LCD or the like, and displays information regarding an imaging mode, a preview image before imaging, a confirmation image after imaging, a focus state, etc. The operation SW 127 includes a power switch, a release (imaging instruction) switch, a zoom switch, an imaging mode selection switch, and the like. The memory 128 is a flash memory that is removably attached to the camera body 120, and records images for recording obtained by imaging.

The phase-difference AF unit 129 performs phase-difference AF using phase-difference image data generated by the camera MPU 125. The image sensor 122 photoelectrically converts a pair of optical images formed by light beams that have passed through different pairs of pupil areas of the exit pupil in the imaging optical system, and outputs a pair of focus detecting signals. The phase-difference AF unit 129 performs a correlation calculation for the two-image data generated by the camera MPU 125 to calculate an image shift amount as a phase difference between them, and calculates (acquires) a defocus amount as information regarding the focus from the image shift amount. The phase-difference AF unit 129 calculates a driving amount of the focus lens 104 according to the calculated defocus amount.

Thus, the phase-difference AF unit 129 performs imaging-surface phase-difference AF using the output of the image sensor 122 without using an AF sensor dedicated to focus detection. In this embodiment, the phase-difference AF unit 129 includes an acquiring unit 129*a* and a calculator 129*b*. The operation of the phase-difference AF unit 129 including the acquiring unit 129*a* and calculator 129*b* will be described below. At least one of the acquiring unit 129*a* and the calculator 129*b* may be provided to the camera MPU 125. The camera MPU 125 and the phase-difference AF unit 129 constitute a detector.

The flicker detector 130 detects flicker from image data for flicker detection obtained from the image processing circuit 124. The camera MPU 125 performs control to adjust the exposure amount so as to reduce the influence of the detected flicker.

The AE unit 131 performs AE control by performing photometry using image data for AE obtained from the image processing circuit 124. More specifically, the AE unit 131 acquires luminance information on image data for AE, and calculates an F-number (aperture value), a shutter speed, and ISO speed as an imaging condition from a difference between the exposure amount acquired from the luminance information and the preset exposure amount. The AE unit 131 performs AE by controlling the aperture value, shutter speed, and ISO speed to the calculated values.

The WB adjustment unit 132 calculates the WB of the image data for WB adjustment obtained from the image processing circuit 124, and adjusts the WB by adjusting RGB color weights according to a difference between the calculated WB and a predetermined proper WB.

The camera MPU 125 can perform processing for detecting an object such as a human face etc. in image data obtained from the image processing circuit 124. The camera MPU 125 can select an image height range for performing phase-difference AF, AE, and WB adjustment according to the detected position and size of the object.

Image Sensor 122

Figure 2:
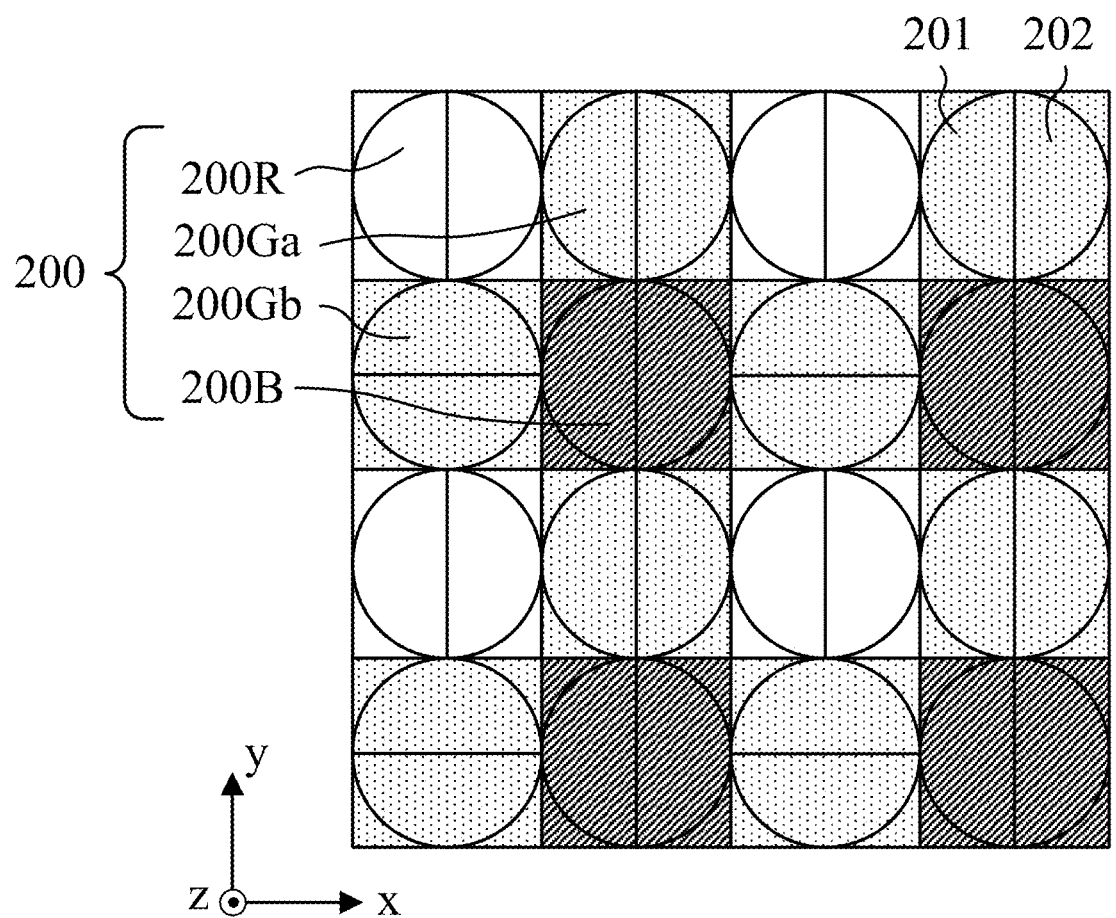
FIG. 2 illustrates a pixel array of an image sensor according to the first embodiment.

FIG. 2 illustrates a pixel array on the imaging surface of the image sensor 122 as a two-dimensional CMOS sensor in this embodiment. Here, the array of imaging pixels is illustrated in a range of 4 columns×4 rows. One pixel unit 200 including 2 columns×2 rows of imaging pixels includes a pixel 200R with a spectral sensitivity of R (red) located at the upper left corner, pixels 200Ga and 200Gb with a spectral sensitivity of G (green) located at the upper right and lower left corners, and a pixel 200B with a spectral sensitivity of B (blue) located at the lower right corner. Each imaging pixel includes a first focus detecting pixel 201 and a second focus detecting pixel 202. In the pixels 200R, 200Ga, and 200B, the first focus detecting pixel 201 and the second focus detecting pixel 202 are arranged in the horizontal direction, and in the pixel 200Gb, the first focus detecting pixel 201 and the second focus detecting pixel 202 are arranged in the vertical direction.

Figures 3A, 3B:
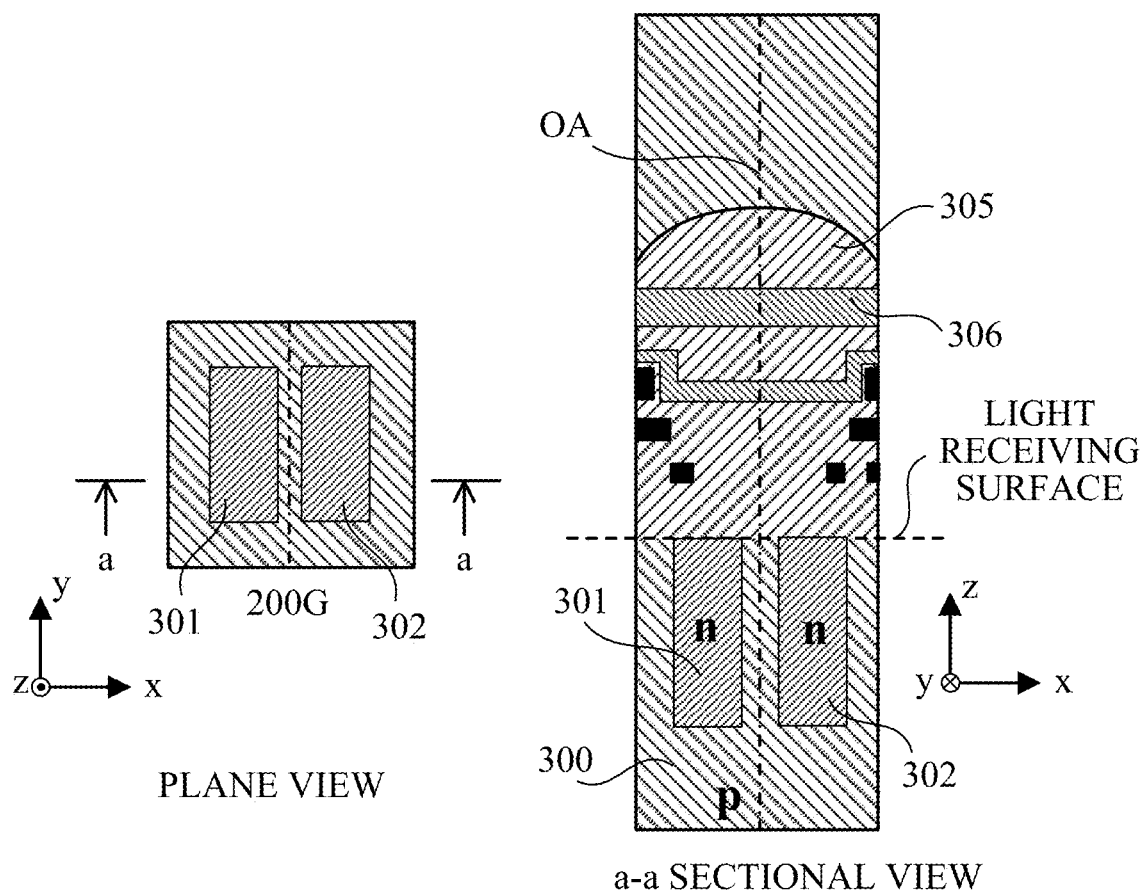
FIGS. 3A and 3B are a plan view and a sectional view of pixels in the first embodiment.

FIG. 3A illustrates the pixel 200Ga when viewed from the incident side (+z side) of the image sensor 122, and FIG. 3B illustrates the pixel structure of the pixel 200Ga when "a-a" section of the pixel 200Ga in FIG. 3A is viewed from the −y side. In the pixel 200Ga, a microlens 305 for condensing incident light is formed on the incident side, and photoelectric converters 301 and 302 divided into two in the x direction are formed. The photoelectric converters 301 and 302 correspond to the first focus detecting pixel 201 and the second focus detecting pixel 202, respectively.

The photoelectric converters 301 and 302 may be pin structure photodiodes in which an intrinsic layer is sandwiched between a p-type layer and an n-type layer, or may be pn junction photodiodes in which the intrinsic layer is omitted. A color filter 306 is formed between the microlens 305 and the photoelectric converters 301 and 302. The spectral transmittance of the color filter may be changed for each focus detecting pixel, or the color filter may be omitted.

Two light beams that entered the pixel 200Ga from the pair of pupil areas are each collected by the microlens 305 and separated by a color filter 306, and then received by photoelectric converters 301 and 302. In each photoelectric converter, electrons and holes are generated in pairs according to a received light amount, and after they are separated by a depletion layer, negatively charged electrons are accumulated in the n-type layer. On the other hand, holes are discharged to the outside of the image sensor 122 through the p-type layer connected to an unillustrated constant voltage source. Electrons accumulated in the n-type layer of each photoelectric converter are transferred to a capacitance unit (FD) via a transfer gate and converted into a voltage signal.

Figure 4:
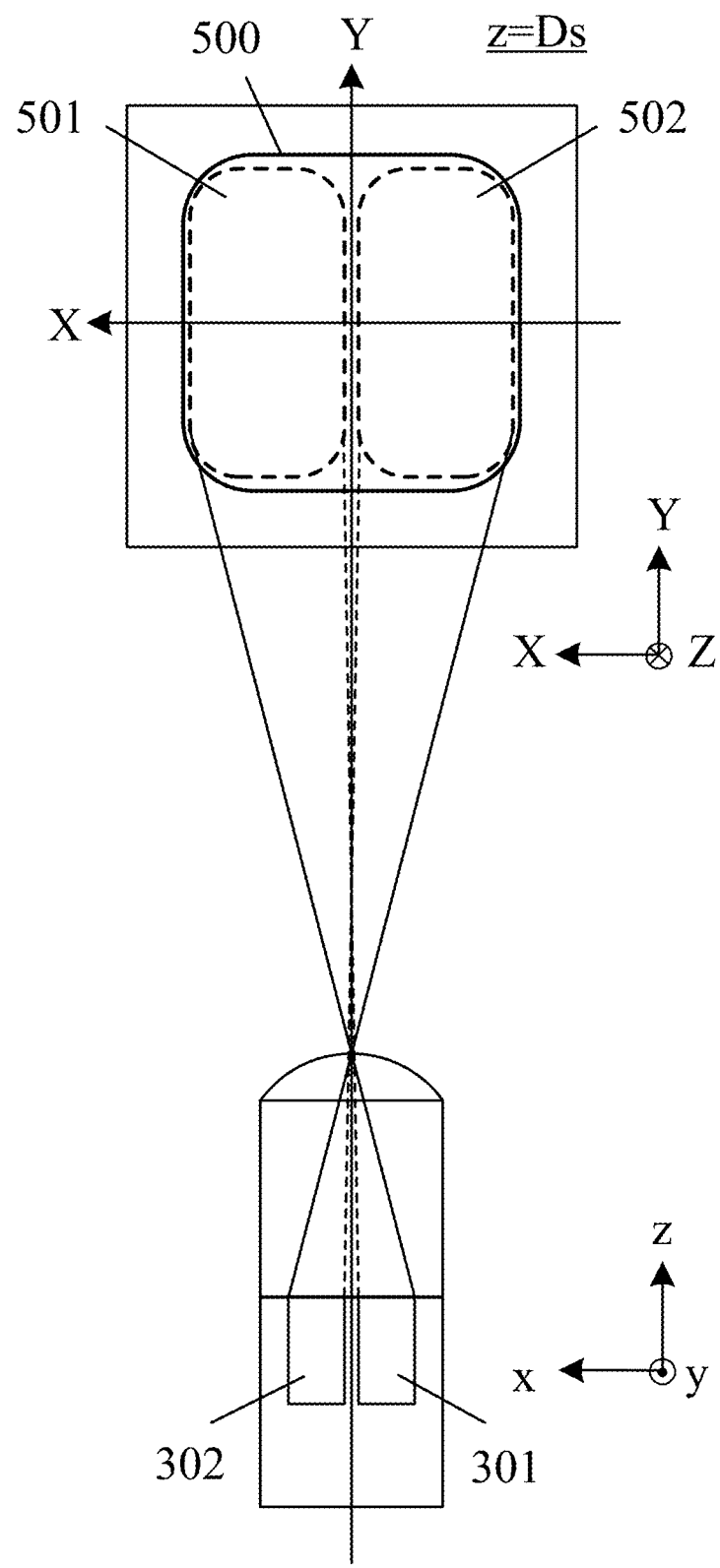
FIG. 4 illustrates pupil division in the first embodiment.

FIG. 4 illustrates a relationship between the pixel structure illustrated in FIGS. 3A and 3B and pupil division. The lower part of FIG. 4 illustrates the pixel structure when the "a-a" section in FIG. 3A is viewed from the +y side, and the upper part of FIG. 4 illustrates a pupil plane at pupil distance DS. In FIG. 4, the x-axis and y-axis of the pixel structure are inverted relative to FIG. 3B in order to correspond to the coordinate axes of the pupil plane. The pupil plane corresponds to the entrance pupil position of the image sensor 122. In this embodiment, by offsetting (shrinking) a microlens position in each pixel from the center of the image sensor 122, the entrance pupils in each pixel overlap each other to form a single entrance pupil for the image sensor 122. The pupil distance DS is a distance between the pupil plane and the imaging surface, and will be referred to as a sensor-pupil distance hereinafter.

As illustrated in FIG. 4, the first pupil area 501 of the first focus detecting pixel 201 has an approximately conjugate relationship with the light receiving surface of the photoelectric converter 301 whose center of gravity is decentered in the −x direction due to the microlens. The first pupil area 501 is a pupil area through which a light beam that can be received by the first focus detecting pixel 201 passes. The center of gravity of the first pupil area 501 is eccentric to the +X side on the pupil plane. The second pupil area 502 of the second focus detecting pixel 202 has an approximately conjugate relationship with the light receiving surface of the photoelectric converter 302 whose center of gravity is decentered in the +x direction due to the microlens. The second pupil area 502 is a pupil area through which a light beam that can be received by the second focus detecting pixel 202 passes. The center of gravity of the second pupil area 502 is eccentric to the −X side on the pupil plane. The pupil area 500 is a pupil area through which a light beam that can be received by the entire pixel 200G including the photoelectric converters 301 and 302 (the first focus detecting pixel 201 and the second focus detecting pixel 202) passes.

Figure 5:
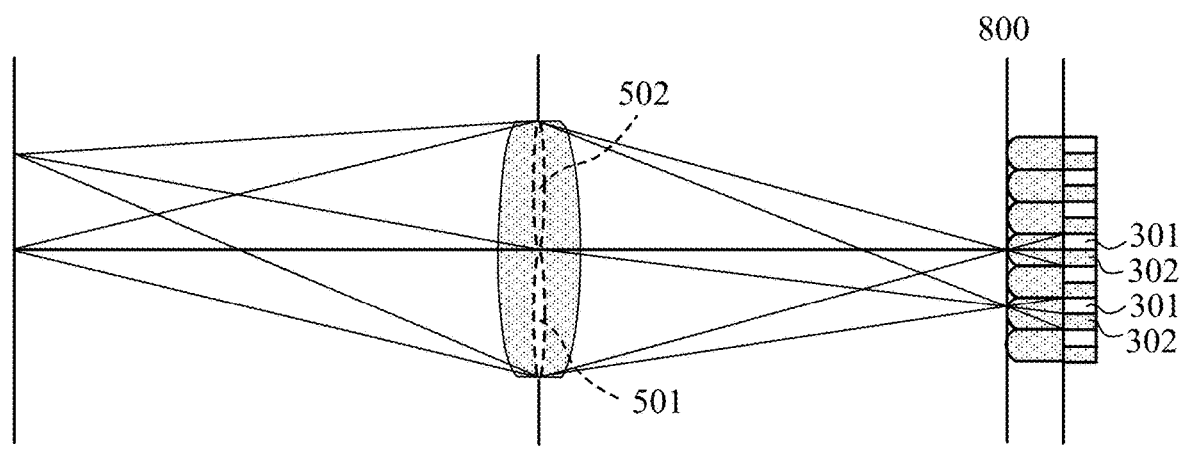
FIG. 5 illustrates another pupil division in the first embodiment.

As illustrated in FIG. 5, light beams that enter the imaging optical system from the object (vertical line on the left in FIG. 5) and pass through the first pupil area 501 and the second pupil area 502 enter corresponding imaging pixels at different angles and are received by the photoelectric converters 301 and 302. The pixels 200R, 200Ga, and 200B perform pupil division in the horizontal direction, and the pixel 200Gb performs pupil division in the vertical direction. Imaging pixels each having a first focus detecting pixel and a second focus detecting pixel receive light beams passing through the first pupil area 501 and the second pupil area 502. A pair of focus detecting signals is generated by combining the respective output signals of the first focus detecting pixel 201 and the second focus detecting pixel 202 in the plurality of imaging pixels. Adding the output signals of the first focus detecting pixel 201 and the second focus detecting pixel 202 of the plurality of imaging pixels can generate an imaging signal with a resolution of the effective pixel number N (=m×n). The other focus detecting signal may be generated by subtracting one of the pair of focus detecting signals from the imaging signal.

This embodiment provides all the imaging pixels on the image sensor 122 with the first and second focus detecting pixels, but two imaging pixels may be used as the first and second focus detecting pixels, and part of the imaging pixels may be provided with the first and second focus detecting pixels.

Relationship Between Defocus Amount and Image Shift Amount

Figure 6:
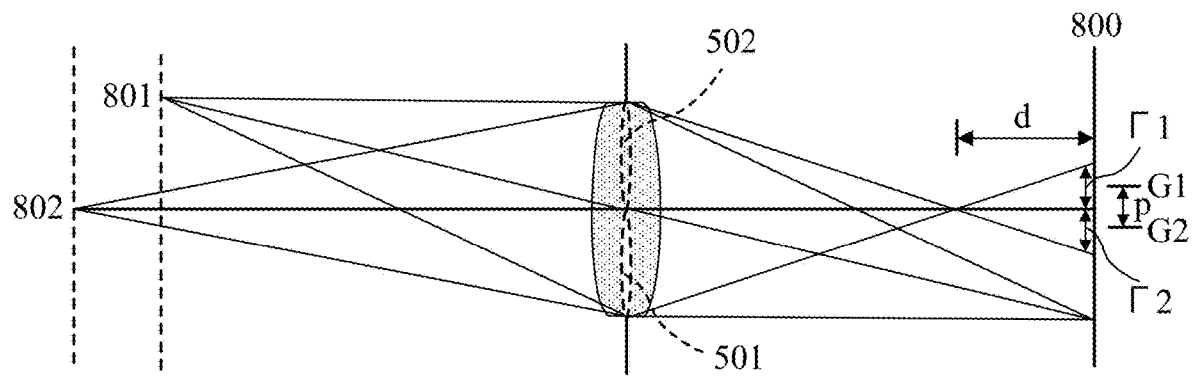
FIG. 6 illustrates a relationship between an image shift amount and a defocus amount in the first embodiment.

FIG. 6 illustrates a relationship between a defocus amount and an image shift amount of two-image data. Reference numeral 800 denotes an imaging surface of the image sensor 122, and the pupil surface of the image sensor 122 is divided into a first pupil area 501 and a second pupil area 502. Defocus amount d has a magnitude (absolute value) of |d|, which is a distance from an imaging position of an object image to the imaging surface 800. A front focus state where the imaging position is located on the object side of the imaging surface 800 has a negative sign (d), and a rear focus state where the imaging position is located on the opposite side of the object of the imaging surface 800 has a positive sign (d>0). An in-focus state in which the imaging position is located on the imaging surface 800 is expressed as d=0.

In FIG. 6, object 801 illustrates an in-focus state (d=0), and object 802 illustrates a front focus state (d<0). The front focus state (d<0) and the rear focus state (d>0) will be collectively referred to as a defocus state (|d|>0).

In the front focus state, among the light beams from the object 802, the light beams that have passed through each of the first pupil area 501 and the second pupil area 502 are once condensed, then spread with widths Γ1 and Γ2 at centers of the center of gravity positions G1 and G2 of the light beams, and form a blurred optical image on the imaging surface 800. These blurred images are received by the first focus detecting pixel 201 and the second focus detecting pixel 202 in each imaging pixel on the imaging surface 800, and thereby the first focus detecting signal and the second focus detecting pixel as a pair of focus detecting signals are generated. The first focus detecting signal and the second focus detecting signal are recorded as blurred images in which the object 802 is spread to blur widths Γ1 and Γ2 at the center of gravity positions G1 and G2 on the imaging surface 800, respectively. The blur widths Γ1 and Γ2 increase approximately in proportion to an increase in the magnitude |d| of the defocus amount d. Similarly, the magnitude |p| of an image shift amount p between the first focus detecting signal and the second focus detecting signal (=difference G1-G2 in the center of gravity position between the light beams) also increases approximately in proportion to the increase of the magnitude |d| of the defocus amount d. Even the rear focus state (d>0) is similar, although the image shift direction between the first focus detecting signal and the second focus detecting signal is opposite to that of the front focus state.

In this embodiment, a difference in the center of gravity of the incident angle distributions in the first pupil area 501 and the second pupil area 502 is referred to as a base length. A relationship between the defocus amount d and the image shift amount p on the imaging surface 800 is approximately similar to a relationship between the base length and the sensor-pupil distance. Since the magnitude of the image shift amount between the first focus detecting signal and the second focus detecting signal increases as the defocus amount d increases, the phase-difference AF unit 129 converts the image shift amount into the defocus amount using the conversion coefficient calculated based on the base length and this relationship.

In the following description, calculating a defocus amount using a pair of focus detecting signals from focus detecting pixels that are horizontally divided like the pixel 200Ga will be referred to as horizontal focus detection (first detection). Calculating a defocus amount using a pair of focus detecting signals from focus detecting pixels that are vertically divided like the pixel 200B will be referred to as vertical focus detection (second detection).

Relationship Between Base Length and Focus Detecting Accuracy

The shorter the base length is, the lower the focus detecting accuracy is. The base length is a difference (distance) between the centers of gravity of the incident angle distributions of the light receiving sensitivities in the first pupil area 501 and the second pupil area 502 on the pupil plane of the image sensor 122. In imaging-surface phase-difference AF, a calculated image shift amount is multiplied by a gain as a conversion coefficient and converted into a defocus amount. At this time, in a case where the image shift amount is small, it is necessary to multiply by a large gain. Since the base length and the image shift amount are approximately in a similar relationship, the shorter the base length is, the smaller the image shift amount is, and it is necessary to multiply by a large gain. Since an error included in the image shift amount is more likely to be magnified in the defocus amount as the gain to be multiplied is larger, the shorter the base length is, the lower the focus detecting accuracy will be.

Factors that Cause Base Length to Decrease

The light beam received by the image sensor 122 is determined by the exit pupil of the imaging optical system. Therefore, the incident angle distribution of the light receiving sensitivity on the pupil plane is cut out according to the shape of the exit pupil, and the base length, which is the difference in the center of gravity of the incident angle distribution, is determined. The base length has aperture dependence; the closer the aperture is, the narrower the light beam passing through the exit pupil is, and the smaller the base length becomes. In general, a base length at a peripheral image height is smaller than a base length at a central image height. In a case where the exit pupil position of the imaging optical system shifts from the pupil position of the image sensor 122, as the image height increases, the position where the incident angle distribution of light receiving sensitivity on the pupil plane is cut off by the exit pupil shifts, and the base length becomes smaller. At a high image height, lens frame shield may occur and cause the base length to reduce.

Decrease in Focus Detecting Accuracy Due to Readout Time Difference in Correlation Direction This embodiment sets a focus detecting frame (detection area) as an area for focus detection on the imaging surface, and performs focus detection using a pair of focus detecting signals generated from signals from pixels within the focus detecting frame.

Figure 7:
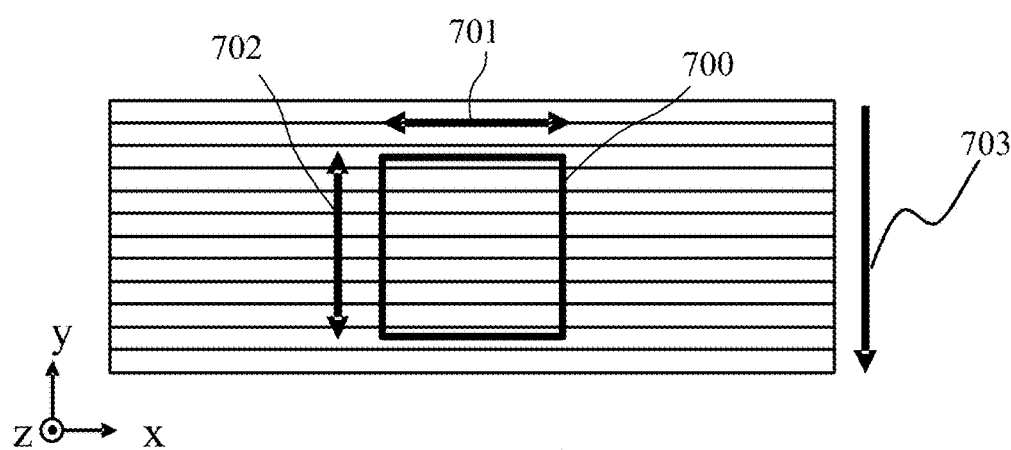
FIG. 7 illustrates a relationship between a focus detecting frame, a correlation direction of the focus detecting signal, and a signal readout direction in the first embodiment.

FIG. 7 illustrates a relationship between focus detecting frame 700, a correlation direction as a direction in which correlation calculation is performed for a pair of focus detecting signals, and a signal readout direction from the image sensor 122. This embodiment sequentially reads out signals for each row from a plurality of pixel rows on the image sensor 122 in direction 703 from the top row to the bottom row. Therefore, the readout time in correlation direction (second direction) 702 in the vertical focus detection within the focus detecting frame 700 is longer than the readout time in correlation direction (first direction) 701 in the horizontal focus detection. In the correlation direction 702 in the vertical focus detection within the focus detecting frame 700, a difference in signal readout time for each row is accumulated as a readout time difference. As a result, the readout time difference in the correlation direction 702 becomes larger than the readout time difference in the correlation direction (first direction) 701 in the horizontal focus detection. In a case where the readout time difference in the correlation direction becomes large, the difference due to the readout time difference is superimposed on the original pair of focus detecting signals, a correct image shift amount cannot be obtained, and the focus detecting accuracy lowers. Such a decrease in focus detecting accuracy tends to be particularly noticeable in a case where the object is a moving object.

This embodiment can control a setting such as the pixel addition number and the row (or line) thinning number in the horizontal and vertical directions during signal readout from the image sensor 122 for each readout mode, according to the relationship between power consumption and focus detecting accuracy. For example, in an imaging mode that requires high-speed signal readout and a large power load, such as during moving image capturing at a high frame rate, pixel addition and row thinning in the vertical direction are performed within the image sensor 122 in order to reduce the power load. On the other hand, in still image capturing in a dark place, etc., signals are read out with no addition and no row thinning in order to improve the S/N ratio and focus detecting accuracy. The signal readout with no addition and no row thinning requires higher power and slower signal readout than those of the signal readout with addition and row thinning.

In a case where the signal is row thinned in the vertical focus detection, the focus detecting accuracy lowers because the signal is missing in the correlation direction. Therefore, this embodiment performs vertical focus detection only when signals are read out without row thinning. More specifically, this embodiment switches between a first readout mode with addition and no row thinning at normal luminance (first luminance state) and a second readout mode with no addition and no row thinning at low luminance (second luminance state) lower than the normal luminance and uses it.

In the following three cases, the focus detecting accuracy significantly lowers due to the readout time difference in the correlation direction.

The first case is a case where the readout time difference in the correlation direction within the focus detecting frame is larger than the shutter speed including the time from the start of charge accumulation in the image sensor 122 to the generation of the focus detecting signal. The slower the readout speed is or the shorter the shutter speed is, the greater the decrease in focus detecting accuracy is.

The second case is a case where the base length is short. The shorter the base length is, the larger the conversion coefficient for converting the image shift amount into the defocus amount is, and as a result, the error in the image shift amount is magnified in the defocus amount, and the decrease in focus detecting accuracy becomes greater. Examples in which the base length becomes short include focus detection with an aperture on the closing side, focus detection at a high image height on the imaging surface, large lens frame shield of the exit pupil in the imaging optical system, large shift between the exit pupil distance of the imaging optical system and the sensor-pupil distance, and the like.

The third case is a case where a horizontal moving speed of an object image on the imaging surface is high. Examples of the high horizontal moving speed of the object image include a case where the object is a moving object and moves at a high speed, a case where the object image and the imaging surface move relative to each other at a high speed due to camera shake such as manual shake during super-telephoto imaging, and the like.

Problems and Solutions in Focus Detection in Two Directions

As described above, this embodiment performs focus detection in each of two (horizontal and vertical) directions within the focus detecting frame, but uses a single focus detection result (defocus amount) to move the focus lens 104. A method of selecting an optimal focus detection result from among the focus detection results in two directions each time is also usable, but in a case where the focus detection result whose focus detecting accuracy has lowered due to the readout time difference in the correlation direction is selected, highly accurate AF cannot be performed.

Thus, in this embodiment, among the two directions of focus detection, the focus detecting accuracy is not used in the direction where the focus detecting accuracy decreases significantly due to the readout time difference in the correlation direction, thereby reducing the decrease in AF accuracy.

Figure 8:
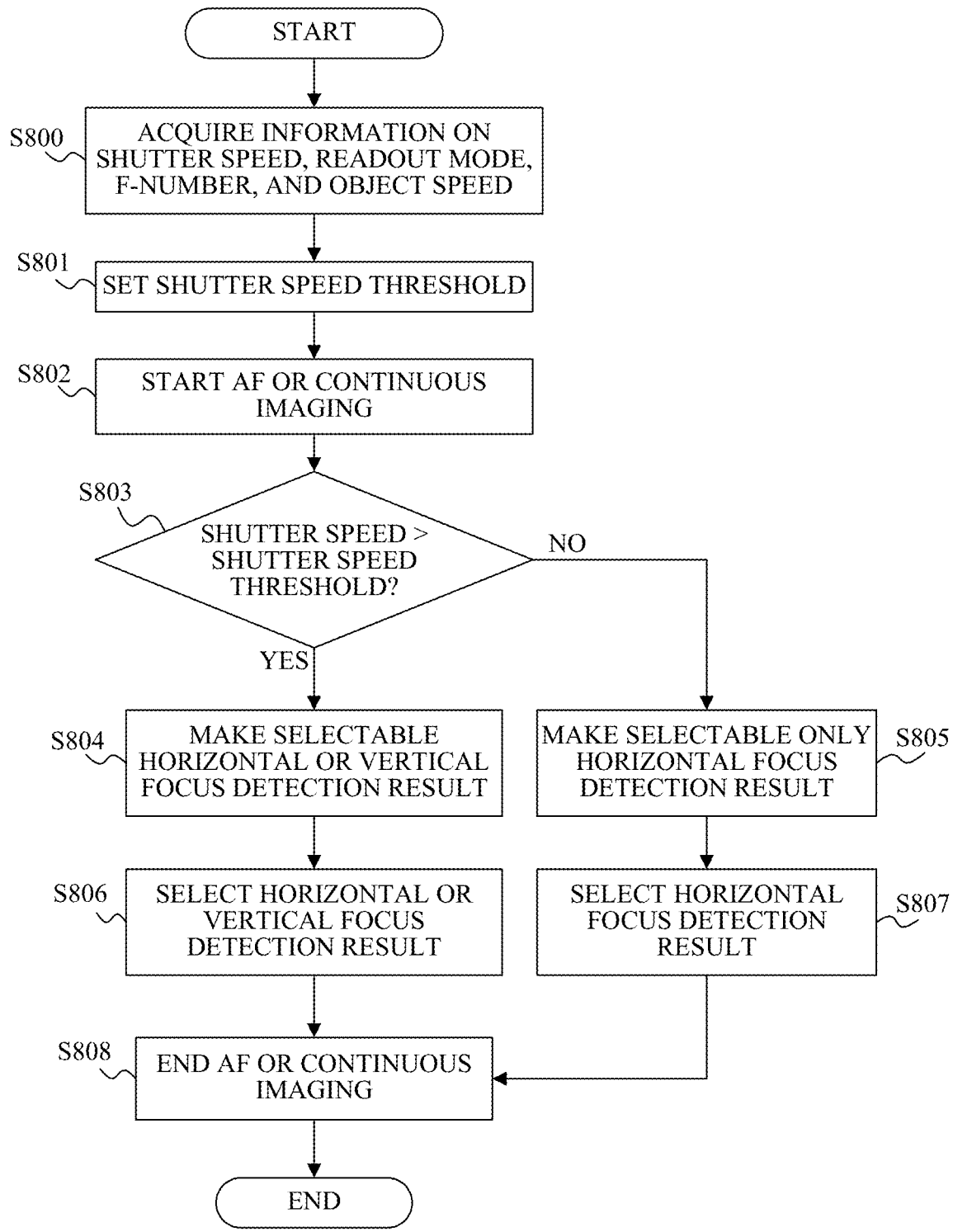
FIG. 8 is a flowchart illustrating processing according to the first embodiment.

A flowchart in FIG. 8 illustrates processing (control method) that the camera MPU 125 executes according to the program. Here, it is assumed that the image sensor 122 sequentially reads out signals for each row from the top row to the bottom row, as described above. Therefore, the readout time difference that occurs in the correlation direction in the vertical focus detection within the focus detecting frame is larger than the readout time difference that occurs in the correlation direction in the horizontal focus detection, and the focus detecting accuracy in the vertical focus detection lowers. Here, it is assumed that either AF (and AE) is repeated at a predetermined period for an object image moving on the imaging surface, or continuous still image imaging is repeated, that is, continuous imaging is performed. It is assumed that AF (and AE) is performed for each image capturing during continuous imaging. In the following description, S stands for the step.

First, in S800, the camera MPU 125 acquires information on a shutter speed, a readout mode, an F-number, and a horizontal moving speed of an object image on the imaging surface (referred to as a horizontal object speed hereinafter).

Next, in S801, the camera MPU 125 sets a shutter speed threshold as a predetermined time. The shutter speed threshold is the longest shutter speed that can permit a decrease in focus detecting accuracy due to the readout time difference in the correlation direction in the vertical focus detection, and is set for each readout mode. More specifically, the camera MPU 125 sets the shutter speed threshold to be long as the readout time difference in the correlation direction relative to the shutter speed in the focus detecting frame becomes large. More specifically, a readout speed in the second read mode with no addition and no row thinning is lower than that of the first readout mode with addition and no row thinning. Therefore, the camera MPU 125 sets the shutter speed threshold in the second readout mode to be larger than the shutter speed threshold in the first readout mode.

Figure 9:
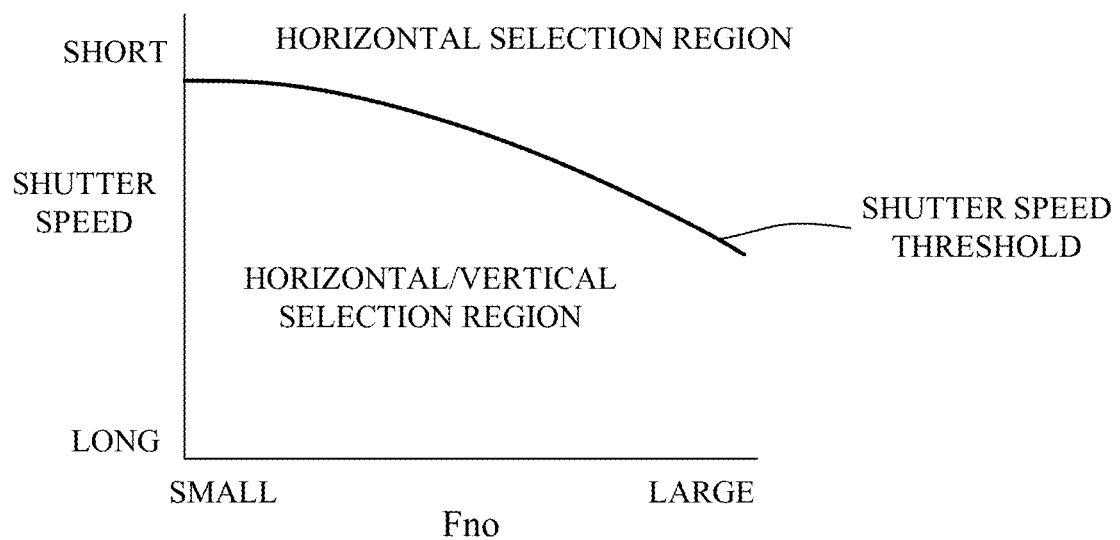
FIG. 9 illustrates a shutter speed threshold in the first embodiment.

The camera MPU 125 also sets the shutter speed threshold to be larger as the F-number is larger. That is, the camera MPU 125 sets the shutter speed threshold to be larger as the conversion coefficient from the image shift amount to the defocus amount in the focus detecting frame is larger. FIG. 9 illustrates the shutter speed threshold that is set to be larger as the F-number (Fno) is larger.

This embodiment acquires the F-number as one of the indexes of the conversion coefficient from the image shift amount to the defocus amount, and sets the shutter speed threshold according to the F-number. However, in addition to the F-number, the shutter speed threshold may be set according to a base length in the focus detecting frame, an image height for focus detection, or a relationship between an exit pupil distance and a sensor-pupil distance. In this case, the shutter speed threshold may be set to be larger as the base length is shorter, as the conversion coefficient for converting the image shift amount to the defocus amount is larger, as an image height for focus detection is higher, and as a distance between an exit pupil distance and a sensor-pupil distance is larger. A shutter speed threshold may be set for each imaging optical system (lens apparatus 100) according to the lens frame shield. In this case, the shutter speed threshold is set to be larger as the imaging optical system has larger lens frame shield.

The camera MPU 125 sets the shutter speed threshold to be larger as the horizontal object speed is higher on the imaging surface. In a case where the object moves relative to the fixed imaging system 10, as the focal length f of the imaging optical system is long, the imaging magnification decreases and the horizontal object speed (velocity) V' on the imaging surface increases, even with the same object distance L and the same horizontal object speed V, as expressed in equation (1) below:

$$V' = V/\text{imaging magnification} = V/(L/f) \quad (1)$$

In a case where an object image horizontally moves on the imaging surface (in other words, image blur) due to camera shake such as manual shake for a still object, a relationship between an image blur amount R on the imaging surface at a camera shake angle θ and a focal length f is expressed by the following equation (2):

$$R = f \cdot \tan(\theta) \quad (2)$$

Using an angular velocity θ', the horizontal object speed R' on the imaging surface is expressed by the following equation (3), and increases as the focal length f becomes longer:

$$R' = f/\cos^2(\theta) \cdot \theta' \quad (3)$$

The shutter speed threshold may be set according to the focal length of the imaging optical system. In this case, the shutter speed threshold is set to be longer as the focal length becomes longer.

The shutter speed threshold may be previously stored as table data in the internal memory of the camera MPU 125, etc., and then read out of the table data and set according to the information acquired in S800.

The camera MPU 125, which has started AF or continuous imaging according to the operation of the release switch in step S802, proceeds to S803 and determines whether the shutter speed is larger than the shutter speed threshold set in S801. The camera MPU 125 performs processing of S804 in a case where the shutter speed is larger than the shutter speed threshold, and performs processing of S805 in a case where the shutter speed is the same as or smaller than the shutter speed threshold.

In S804, the camera MPU 125 enables one of a focus detection result based on horizontal focus detection (referred to as horizontal detection result hereinafter) and a focus detection result based on vertical focus detection (referred to as vertical detection result hereinafter) to be selected. FIG. 9 illustrates a region where the shutter speed is longer than the shutter speed threshold and the horizontal detection result and the vertical detection result can be selected as the horizontal/vertical selection region. Next, in S806, the camera MPU 125 selects one of the horizontal detection result and the vertical detection result as the focus detection result to be used, and performs processing (first processing) for executing AF according to the selected focus detection result. More specifically, the camera MPU 125 determines the reliability of the horizontal detection result and the vertical detection result based on the degree of variation of each the horizontal detection result and the vertical detection result, and selects a focus detection result with higher reliability. Alternatively, the camera MPU 125 may detect an edge component of an object image and select a focus detection result according to the edge direction. For example, the camera MPU 125 may select the horizontal detection result for an object image with many vertical edge components, and the vertical detection result for an object image with many horizontal edge components.

On the other hand, in S805, the camera MPU 125 makes selectable only the horizontal detection result. FIG. 9 illustrates a region where the shutter speed is equal to or smaller than the shutter speed threshold and only the horizontal detection result can be selected (the vertical detection result cannot be selected) as the horizontal selection region. Next, in S807, the camera MPU 125 selects only the horizontal detection result as the focus detection result and performs processing (second processing) to execute AF using the selected focus detection result. Thereby, at a shutter speed where a decrease in accuracy of the vertical detection result is not acceptable, AF is performed based on the horizontal detection result without selecting the vertical detection result, and as a result, a decrease in AF accuracy is suppressed.

Thereafter, during AF or continuous imaging, the camera MPU 125 continues the processing method set in S804 or S805 at the start of the processing (that makes selectable either the horizontal detection result or the vertical detection result or only the horizontal detection result) until the AF or continuous imaging ends in S808. Thereby, even if the shutter speed changes relative to the shutter speed threshold due to object luminance changes or the like during the AF or continuous imaging, the continuity of focus detection results is maintained. For example, in a case where the vertical detection result is selected for an object image with many horizontal edge components, the object becomes brighter, the shutter speed becomes shorter than the shutter speed threshold, and the horizontal selection area is selectable, continuity of detection results is maintained by making continuously selectable the vertical detection result as well.

Second Embodiment

Figure 10:
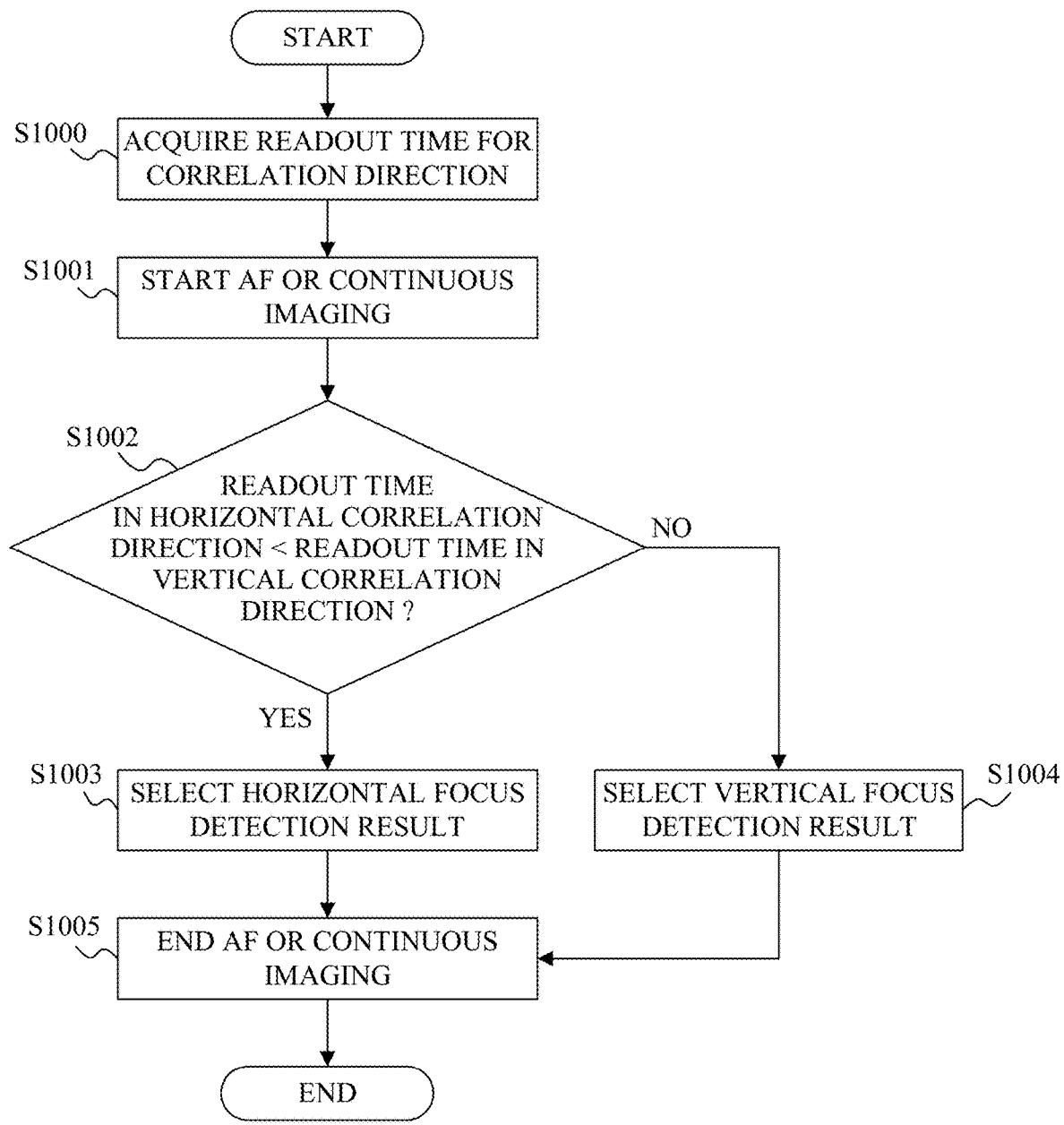
FIG. 10 is a flowchart illustrating processing according to a second embodiment.

FIG. 10 illustrates processing (control method) executed by the camera MPU 125 according to a second embodiment. The first embodiment sequentially reads out signals for each row from a plurality of pixel rows of the image sensor 122 from the top row to the bottom row. On the other hand, the second embodiment enables the user to select a readout mode in which the image sensor 122 is sequentially read out for each row and a readout mode in which the image sensor 122 is sequentially read out for each column. The configurations of the camera body 120 and the lens apparatus 100 are the same as those illustrated in FIG. 1 in the first embodiment, and those elements in the second embodiment, which are corresponding elements in the first embodiment, will be designated by the same reference numerals as those of the first embodiment.

First, in S1000, the camera MPU 125 acquires a readout time in the correlation direction (first direction) of horizontal focus detection and a readout time in the correlation direction (second direction) of vertical focus detection. At this time, the camera MPU 125 may acquire information on which readout time is longer (shorter) instead of the actual readout time. A relationship may be acquired between the readout times in respective correlation directions by acquiring information of which of the readout mode for sequential readout for each row and the readout mode for sequential readout for each column is selected.

Next, the camera MPU 125, which has started AF or continuous imaging according to the operation of the release switch in S1001, proceeds to S1002, and compares the readout time in the correlation direction of horizontal focus detection and the readout time in the correlation direction of vertical focus detection. In a case where the readout time in the correlation direction for the horizontal focus detection is shorter than the readout time in the correlation direction for the vertical focus detection, the flow proceeds to S1003 and the camera MPU 125 selects the horizontal detection result as the focus detection result to be used. On the other hand, in a case where the readout time in the correlation direction for the vertical focus detection is shorter than the readout time in the correlation direction for the horizontal focus detection, the flow proceeds to S1004 and the camera MPU 125 selects the vertical detection result as the focus detection result to be used.

Thereafter, during AF or continuous imaging, the camera MPU 125 continues focus detection (horizontal or vertical focus detection) for acquiring the focus detection result selected in S1003 or S1004 at the start of the AF or continuous imaging until the AF or continuous imaging ends in S1005. Thereby, the continuity of focus detection result during AF or continuous imaging can be maintained.

In each of the above embodiments, information regarding focus (defocus amount) is acquired from a phase difference between a pair of detection signals and AF is performed using that information, but information regarding a distance may be acquired from the phase difference and a distance map may be created, an object may be detected, or other processing may be performed using the information.

OTHER EMBODIMENTS

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has described example embodiments, it is to be understood that some embodiments are not limited to the disclosed embodiments. The scope of the following claims is to be accorded the broadest interpretation so as to encompass all such modifications and equivalent structures and functions.

Each embodiment can suppress a decrease in accuracy of information regarding focus or a distance acquired using a signal from an image sensor.

This application claims priority to Japanese Patent Application No. 2023-091779, which was filed on Jun. 2, 2023, and which is hereby incorporated by reference herein in its entirety.

What is claimed is:

1. An image pickup apparatus comprising:
   an image sensor that includes a plurality of pixels configured to photoelectrically convert each of light beams that have passed through mutually different pupil areas in an optical system, signal readout from the pixels in a first direction being sequentially performed in a second direction; and
   a processor configured to:
   acquire information regarding focus or a distance by detecting a phase difference between a pair of detection signals generated by signals read out of at least a part of the plurality of pixels,
   perform a first detection for detecting the phase difference in the first direction and a second detection for detecting the phase difference in the second direction,
   perform first processing for acquiring the information by the first detection or the second detection in a case where a shutter speed including a period during which the pair of detection signals are generated is longer than a predetermined time,
   perform second processing for acquiring the information by the first detection irrespective of the second detection in a case where the shutter speed is shorter than the predetermined time, and
   set the predetermined time to be longer as an F-number of the optical system is larger.

2. The image pickup apparatus according to claim 1, wherein a readout time in the second direction is longer than a readout time in the first direction in a detection area for generating the pair of detection signals on the image sensor.

3. The image pickup apparatus according to claim 2, wherein a readout mode for reading out the signal from the pixels in the detection area without thinning out in the second direction includes a first readout mode, and a second readout mode in which a readout time in the second direction is longer than a readout time in the first readout mode, and wherein the processor is configured to set the predetermined time in the second readout mode to be longer than the predetermined time in the first readout mode.

4. The image pickup apparatus according to claim 1, wherein while the information is repeatedly acquired, the processor is configured to continue to perform processing set at a start of acquiring the information out of the first processing and the second processing.

5. The image pickup apparatus according to claim 1, wherein the processor is configured to:
   acquire the information by multiplying the phase difference by a conversion coefficient, and
   set the predetermined time to be longer as the conversion coefficient is larger.

6. The image pickup apparatus according to claim 1, wherein the processor is configured to set the predetermined time to be longer as an image height for detecting the phase difference is higher.

7. The image pickup apparatus according to claim 1, wherein the processor is configured to set the predetermined time to be longer as a moving speed of an object image on the image sensor is higher.

8. The image pickup apparatus according to claim 1, wherein the processor is configured to set the predetermined time to be longer as a focal length of the optical system is longer.

9. An image pickup apparatus comprising:
   an image sensor that includes a plurality of pixels configured to photoelectrically convert each of light beams that have passed through mutually different pupil areas in an optical system; and
   a processor configured to:
   acquire information regarding focus or a distance by detecting a phase difference between a pair of detection signals generated by signals read out of at least a part of the plurality of pixels,
   perform a first detection for detecting the phase difference in a first direction and a second detection for detecting the phase difference in a second direction different from the first direction,
   acquire the information by the first detection in a case where a readout time in the first direction is shorter than a readout time in the second direction, in a detection area for generating the pair of detection signals on the image sensor, and
   acquire the information by the second detection in a case where the readout time in the second direction is shorter than the readout time in the first direction.

10. A control method of an image pickup apparatus that includes an image sensor that includes a plurality of pixels configured to photoelectrically convert each of light beams that have passed through mutually different pupil areas in an optical system, signal readout from the pixels in a first direction being sequentially performed in a second direction, the control method comprising the steps of:
    acquiring information regarding focus or a distance by detecting a phase difference between a pair of detection signals generated by signals read out of at least a part of the plurality of pixels,
    performing a first detection for detecting the phase difference in the first direction and a second detection for detecting the phase difference in the second direction,
    performing first processing for acquiring the information by the first detection or the second detection in a case where a shutter speed including a period during which the pair of detection signals are generated is longer than a predetermined time, performing second processing for acquiring the information by the first detection irrespective of the second detection in a case where the shutter speed is shorter than the predetermined time, and setting the predetermined time to be longer as an F-number of the optical system is larger.

11. A control method of an image pickup apparatus that includes an image sensor that includes a plurality of pixels configured to photoelectrically convert each of light beams that have passed through mutually different pupil areas in an optical system, the control method comprising the steps of:

acquiring information regarding focus or a distance by detecting a phase difference between a pair of detection signals generated by signals read out of at least a part of the plurality of pixels, performing a first detection for detecting the phase difference in a first direction and a second detection for detecting the phase difference in a second direction different from the first direction, acquiring the information by the first detection in a case where a readout time in the first direction is shorter than a readout time in the second direction, in a detection area for generating the pair of detection signals on the image sensor, and acquiring the information by the second detection in a case where the readout time in the second direction is shorter than the readout time in the first direction.

12. A non-transitory computer-readable storage medium storing a program that causes a computer of the image pickup apparatus to execute processing according to the control method according to claim 10.

13. A non-transitory computer-readable storage medium storing a program that causes a computer of the image pickup apparatus to execute processing according to the control method according to claim 11.

* * * * *